US012424187B2

(12) United States Patent
Lin et al.

(10) Patent No.: US 12,424,187 B2
(45) Date of Patent: Sep. 23, 2025

(54) STRUCTURE OF STABLE LIQUID CRYSTAL DISPLAY MODULE CAPABLE OF REDUCING CROSSTALK INTERFERENCE

(71) Applicants: Chin Nan Lin, Hsinchu (TW); Wei Lun Tang, Hsinchu (TW); Chiping Lu, Hsinchu (TW)

(72) Inventors: Chin Nan Lin, Hsinchu (TW); Wei Lun Tang, Hsinchu (TW); Chiping Lu, Hsinchu (TW)

( * ) Notice: Subject to any disclaimer, the term of this patent is extended or adjusted under 35 U.S.C. 154(b) by 0 days.

(21) Appl. No.: 18/741,112

(22) Filed: Jun. 12, 2024

(65) Prior Publication Data

US 2024/0420660 A1 Dec. 19, 2024

(30) Foreign Application Priority Data

Jun. 14, 2023 (TW) ................................ 112122269

(51) Int. Cl.
*G09G 3/36* (2006.01)

(52) U.S. Cl.
CPC ......... *G09G 3/3688* (2013.01); *G09G 3/3677* (2013.01); *G09G 2320/0209* (2013.01); *G09G 2330/021* (2013.01)

(58) Field of Classification Search
CPC ...... G09G 3/36; G09G 3/3611; G09G 3/3614; G09G 3/3622; G09G 3/3625; G09G 3/364; G09G 3/3644; G09G 3/3648; G09G 3/3655; G09G 3/3659; G09G 3/3674; G09G 3/3677; G09G 3/3681; G09G 3/3685; G09G 3/3688; G09G 3/3692; G09G 3/3696; G09G 2320/0209; G09G 2320/0214; G09G 2320/0219
USPC .................................................. 345/87–104
See application file for complete search history.

(56) References Cited

U.S. PATENT DOCUMENTS

| | | | | |
|---|---|---|---|---|
| 6,421,038 B1 * | 7/2002 | Lee | G09G 3/3677 | 345/94 |
| 2005/0104845 A1 * | 5/2005 | Moon | G09G 3/344 | 345/107 |
| 2005/0168417 A1 * | 8/2005 | Ha | G09G 3/2011 | 345/76 |
| 2006/0001640 A1 * | 1/2006 | Lee | G09G 3/3677 | 345/100 |
| 2008/0143662 A1 * | 6/2008 | Hong | G09G 3/3677 | 345/204 |

(Continued)

*Primary Examiner* — Ke Xiao
*Assistant Examiner* — Nelson Lam
(74) *Attorney, Agent, or Firm* — Rosenberg, Klein & Lee

(57) ABSTRACT

A structure of stable liquid crystal display (LCD) module includes at least one data driver for receiving data control signals from a master control unit (MCU) and transmitting data driving signals via a part of data lines to liquid crystal units in the stable LCD module; at least one data switch component for grounding the data lines via capacitors when the data lines do not have the data driving signals; at least one scan driver for receiving scan control signals from the MCU and transmitting scan driving signals via a part of scan lines to the liquid crystal units in the stable LCD module; and at least one scan switch component for grounding the scan lines via capacitors when the scan lines do not have the scan driving signals. In this way, crosstalk interference caused by energy spillover generated by neighboring data and/or scan lines can be eliminated.

20 Claims, 6 Drawing Sheets

(56) References Cited

U.S. PATENT DOCUMENTS

| | | | | |
|---|---|---|---|---|
| 2011/0310079 A1* | 12/2011 | Kim | G06F 3/042 | 345/211 |
| 2013/0234919 A1* | 9/2013 | Choi | G09G 3/3677 | 345/92 |
| 2015/0269900 A1* | 9/2015 | Iwamoto | G09G 3/3648 | 345/100 |
| 2016/0005371 A1* | 1/2016 | Watsuda | G09G 3/3685 | 345/55 |

* cited by examiner

STRUCTURE OF STABLE LIQUID CRYSTAL DISPLAY MODULE CAPABLE OF REDUCING CROSSTALK INTERFERENCE

FIELD OF THE INVENTION

The present invention relates to a structure of stable liquid crystal display module capable of reducing crosstalk interference, and more particularly, to a stable liquid crystal display module structure that eliminates crosstalk interference with neighboring areas caused by energy spillover generated by driven data lines/scan lines and accordingly, ensure the liquid crystal display module to maintain normal picture quality.

BACKGROUND OF THE INVENTION

Liquid crystal skeletons have the advantages of low energy consumption, low radiation, long service life and high resolution, and are therefore widely applied to various electronic devices, such as computers, cell phones, personal digital assistants (PDA), and electronic books, and any other field that requires for image or picture display and the like. However, the liquid crystal (i.e. pixel) units are arranged in extremely high density with the increased resolution and are subject to many limits in various materials and structures, crosstalk interference with neighboring liquid crystal (pixel) units tends to occur when multiple columns and rows of liquid crystal (pixel) units are driven to act, which not only reversely affects the normal display of the overall picture, but also forms disadvantages in applications.

There are different causes of crosstalk interference. In the conventional liquid crystal display skeleton, such as the super-twist nematic (STN) display, when it operates, control (driving) signals must be repeatedly applied to data lines and scan lines that are connected to the electrodes at two ends of the liquid crystal units, so as to control the large amount of liquid crystal units to change their display mode (state) and form various types of image screens. In the conventional repeated scan driving manner, the liquid crystal units would return to a specific (or initial) state once the control or driving signals applied to the data lines and the scan lines are interrupted, and the image screens formed by the liquid crystal units will disappear accordingly. Therefore, in practical application of the conventional liquid crystal skeletons, it is very difficult to reduce the power consumed during the operation of the conventional liquid crystal units. The use of the conventional liquid crystal skeletons is particularly uneconomical for use in some specific applications that require for less screen switching.

Therefore, related manufacturers have developed bistable and multistable liquid crystal display skeletons, which are characterized mainly in applying repeatedly control (driving) signals of different waveforms, voltages or frequencies to the data lines and the scan lines connected to the electrodes at two ends of the liquid crystal units in the bistable or multistable liquid crystal display skeleton, so that the bistable or the multistable liquid crystal units can switch between at least two different displaying modes (states). When a plurality of bistable liquid crystal units is used to form various changes in the image screen, the displayed screen and state can be maintained stably even if the control (driving) signals are interrupted. Since this driving type does not require repeated scan and the original displayed image screen can be maintained without the need of applying electrical power continuously, it can effectively reduce the power consumption during operation to enable upgraded economical benefit and is very suitable for use when the displayed image screen does not need quick and frequent switching.

In the conventional liquid crystal display skeleton such as the STN display, a diversity of driving ways and screen display contents is available, which results in relatively complicate causes of crosstalk interference. The disclosure of Taiwan Patent Pub. No. 1293450 provides an effective solution to the crosstalk interference caused by capacitive coupling effect of common electrodes. The above Taiwan patent discloses display panel driving device and method for reducing crosstalk. The driving device includes a plurality of source driving units, a NOT gate, and a time sequence controller. The time sequence controller uses the NOT gate to provide reversed-phase control signals to the source driving units. The driving method includes using a time sequence controller to provide polarity control signals to a part of the source driving units, reversing the polarity of the polarity control signals, and providing the reversed polarity to the other part of the source driving units. With the above driving device and method, the polarities of pixels of the same horizontal scan line can be neutralized as much as possible to avoid crosstalk between data lines caused by coupling of common voltage $V_{com}$. With these arrangements, the crosstalk can be reduced effectively to improve the display effect of the display panel.

Taiwan Patent Pub. No. 1509591 discloses a driving controller, a display panel device, and a driving method capable of reducing crosstalk of display. The driving controller includes a type detection unit and a polarity configuration unit. The polarity configuration unit receives a color gamut signal corresponding to any line of data in an image data for determining the data type of the data in the line; and the polarity configuration unit is electrically connected to the type detection unit to generate a polarity configuration corresponding to the data type of the data in the line, so as to reduce crosstalk interference.

However, different display characteristics lead to difference in driving skeletons. In the case of the above-mentioned bistable or multistable liquid crystal skeleton, the liquid crystal units must be overwritten or overridden before the display content can be changed. Therefore, the control (driving) signals applied to the data lines and the scan lines have a relatively high voltage about 70 to 80 volts. The high voltage generates relatively high energy, which tends to produce a spillover (induction) effect and causes crosstalk interference with neighboring liquid crystal units. This cause of crosstalk interference is different from that occurred in the conventional liquid crystal display skeletons and there is currently not effective solution to the crosstalk interference caused by bistable or multistable liquid crystal skeleton. It is therefore tried by the inventor to develop a structure of stable liquid crystal display module capable of reducing crosstalk interference.

SUMMARY OF THE INVENTION

A primary object of the present invention is to provide a structure of stable liquid crystal display (LCD) module capable of reducing crosstalk interference. The structure includes at least one data driver, at least one data switch component, at least one scan driver, and at least one scan switch component. The data driver receives data control signals from a master control unit (MCU) and in turn transmits data driving signals via a part of data lines to liquid crystal units in the stable LCD module. The data switch component detects the data lines synchronously to determine whether the data lines have the data driving signals or not, and data lines that do not have the data driving signals are grounded via capacitors to thereby eliminate crosstalk interference between data lines caused by energy spillover. The scan driver receives scan control signals from the MCU and in turn transmits driving signals via a part of scan lines to the liquid crystal units in the stable LCD module. The scan switch component detects the scan lines synchronously to determine whether the scan lines have the scan driving signals or not, and scan lines that do not have the scan driving signals are grounded via capacitors to thereby eliminate crosstalk interference between scan lines caused by energy spillover. Thus, the stable LCD module can maintain normal picture display quality.

Another object of the present invention is to provide the above structure of stable LCD module capable of reducing crosstalk interference, the data switch component of which includes a plurality of data switch units provided on the data lines. In the case the data lines have the data driving signals, the data lines are electrically connected in a normal way; and in the case the data lines do not have the data driving signals, the data lines are grounded via capacitors, so that crosstalk interference caused by energy spillover of neighboring data lines can be eliminated. The scan switch component includes a plurality of scan switch units provided on the scan lines. In the case the scan lines have the scan driving signals, the scan lines are electrically connected in a normal way; and in the case the scan lines do not have the scan driving signals, the scan lines are grounded via capacitors, so that crosstalk interference caused by energy spillover of neighboring scan lines can be eliminated.

A further object of the present invention is to provide the above structure of stable LCD module capable of reducing crosstalk interference, which is applicable to different types of stable liquid crystal skeletons, such as bistable liquid crystal skeleton, multistable liquid crystal skeleton, memory-type liquid crystal skeleton, or other similar liquid crystal skeletons that use driven passive matrix to display patterns. Further, in the case of the multistable liquid crystal skeleton, the structure of the present invention may also be cholesteric liquid crystal skeleton, surface-stabilized ferroelectric liquid crystal skeleton, bistable twisted nematic liquid crystal skeleton, Semectic A liquid crystal skeleton and bend-splay nematic liquid crystal skeleton, and accordingly have a wide scope of applications.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
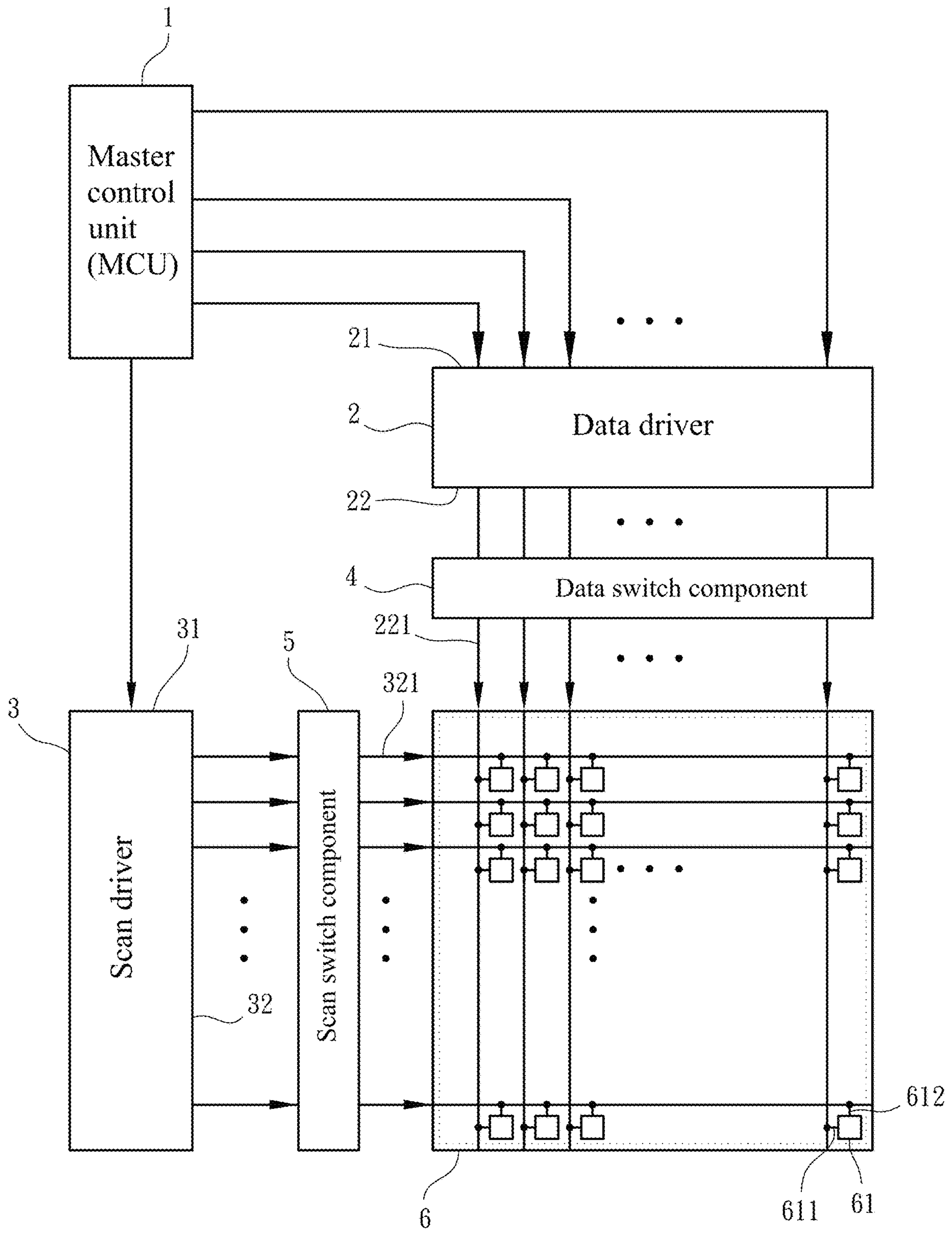
FIG. 1 is a block diagram of a circuit for a first embodiment of the present invention.
Figure 2:
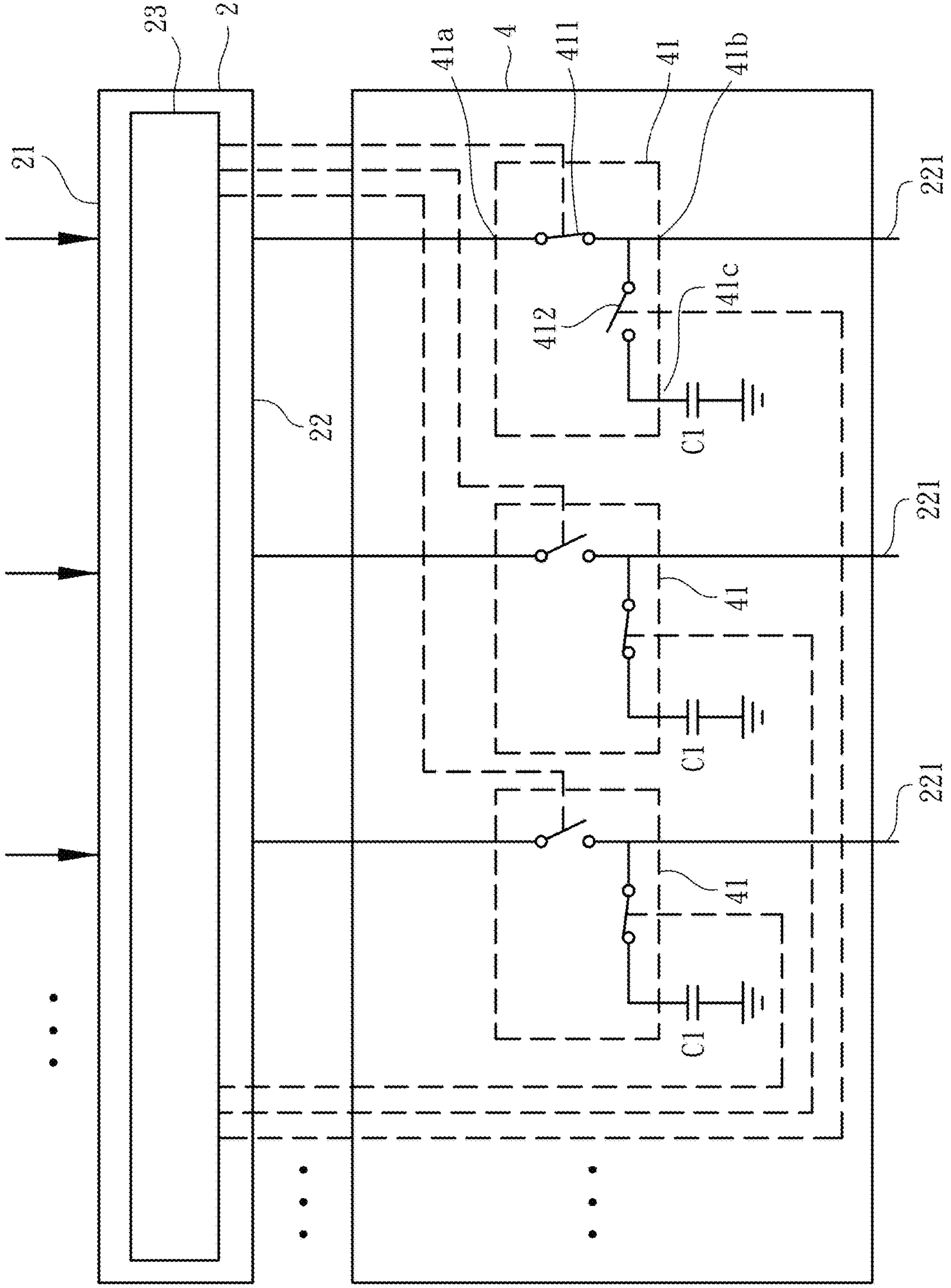
FIG. 2 is a simple circuit diagram showing related portions of a data switch component and a data driver in the first embodiment of the present invention.
Figure 3:
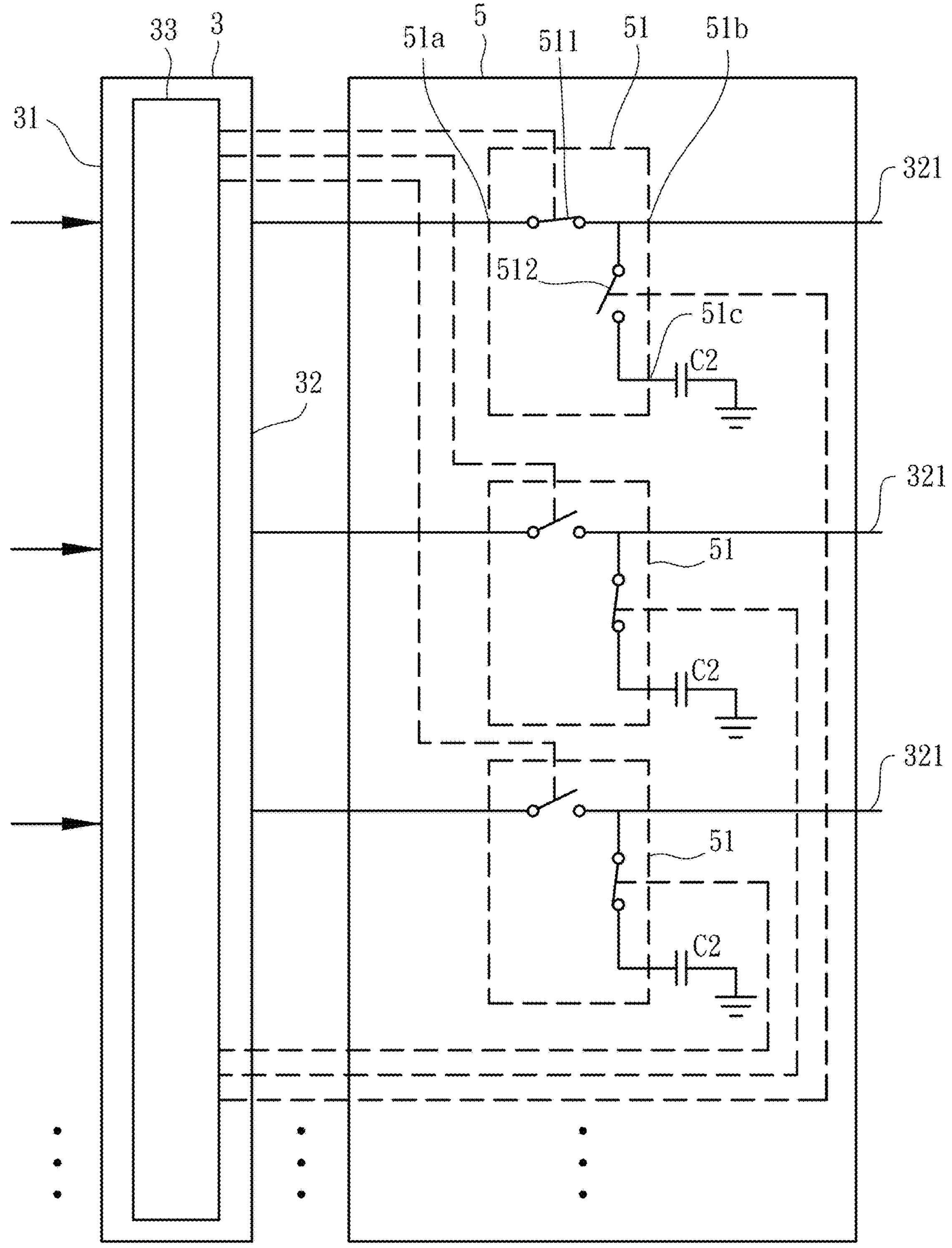
FIG. 3 is a simple circuit diagram showing related portions of a scan switch component and a scan driver in the first embodiment of the present invention.

Please refer to FIGS. 1 to 3. A structure of stable liquid crystal display module capable of reducing crosstalk interference according to a first embodiment of the present invention includes at least a data driver 2, a scan driver 3, a data switch component 4, and a scan switch component 5. The data driver 2 has a data input side 21 and a data output side 22. The data input side 21 is electrically connected to a master control unit (MCU) 1, and the data output side 22 is electrically connected via a plurality of data lines 221 to electrodes 611 of liquid crystal units 61 in a stable liquid crystal display (LCD) module 6. The data input side 21 receives data control signals output by the MCU 1, and the received data control signals are converted at the data driver 2, so that data driving signals are sent to at least a part of the data lines 221.

In practical application of the present invention, the data control signals output by the MCU 1 include at least one (i.e. can be more than one at the same time) data signal for driving the liquid crystal units 61 to act. The data driver 2 can have a built-in boost module (not shown) for converting the data signal into data driving signals of a working voltage about 60~100V output in a specific waveform, such as square waveform. Therefore, the part of data lines 221 having the data driving signals are very possible to generate energy spillover effect on neighboring areas (i.e. the other part of the data lines 221 that do not have the data driving signals) due to their relatively higher working voltage and accordingly, tend to cause crosstalk interference.

The data switch component 4 detects the data lines 221 synchronously to determine whether the data lines 221 have the data driving signals or not. In the case the data lines 221 do not have the data driving signals, the data lines 221 are respectively grounded via a capacitor C1. In this way, the data lines 221 not having the data driving signals can be effectively filtered and protected from crosstalk interference caused by energy spillover of neighboring data lines 221 having the data driving signals.

In a feasible embodiment, the data switch component 4 includes a plurality of data switch units 41 provided on the data lines 221. Each of the data switch units 41 has a data input end 41*a*, a data output end 41*b*, and a data grounding end 41*c*. The data input end 41*a* is electrically connected to the data driver 2, the data output end 41*b* is connected to the data line 221, and the data grounding end 41*c* is grounded via the capacitor C1. A first data switch 411 is provided between the data input end 41*a* and the data output end 41*b*, and a second data switch 412 is provided between the data output end 41*b* and the data grounding end 41*c*. The data driver 2 internally includes a data switch control module 23, which is able to identify the data lines 221 synchronously to determine whether the data lines 221 have the data driving signals or not and controls the first or the second data switches 411, 412 to act, so as to connect the data output ends 41*b* to one of the data input ends 41*a* and the data grounding ends 41*c*.

When the above described structure operates, the data switch control module 23 detects the data lines 221 synchronously to determine whether they have the data driving signals or not, or receives synchronously the data control signals output by the MCU 1 to determine whether the data lines 221 have the data driving signals or not. In the case the data lines 221 have the data driving signals or in the case the data control signals have data driving signals capable of driving the liquid crystal units 61 to act, the data switch control module 23 controls the first data switches 411 to connect the data input ends 41*a* to the data output ends 41*b*, so that the data driving signals output by the data driver 2 are transmitted via the data lines 221 to the corresponding liquid crystal units 61 in the stable LCD module 6 and drive the same. On the other hand, in the case the data lines 221 do not have the data driving signals, or in the case the data control signals do not have the data driving signals for driving the liquid crystal units 61 to act, the data switch control module 23 controls the second data switches 412 to connect the data output ends 41*b* to the data grounding ends 41*c*, so that the data lines 221 that do not have the data driving signals are grounded via the capacitors C1. Therefore, the part of data lines 221 without the data driving signals are filtered and protected against crosstalk interference caused as an energy spillover effect generated by near data lines 221 that have the data driving signals.

The scan driver 3 has a scan input side 31 and a scan output side 32. The scan input side 31 is electrically connected to the MCU 1 and the scan output side 32 is electrically connected via a plurality of scan lines 321 to the other electrodes 612 of the liquid crystal units 61 in the stable LCD module 6. The scan input side 31 receives scan control signals output by the MCU 1, and the received scan control signals is converted at the scan driver 3 into scan driving signals, which are sent to at least a part of the scan lines 321. The scan driving signals and the data driving signals work together to drive the liquid crystal units 61 to act, such that the stable LCD module 6 can display various preset images and pictures.

In practical application of the present invention, the scan control signals output by the MCU 1 in each time, in most cases, has only one scan signal that can drive the liquid crystal units 61 to act; and the scan driver 3 can have a built-in boosting module (not shown) for converting the scan signals into scan driving signals of a working voltage about 60~100V and output in a specific waveform, such as square Therefore, crosstalk interference with neighboring scan lines 321 having not the scan driving signals is rarely caused by the scan driving signals, though a few cases might still be possible.

The scan switch component 5 detects the scan lines 321 synchronously to determine whether they have the scan driving signals or not. In the case the scan lines 321 do not have the scan driving signals, the scan lines 321 are respectively grounded via a capacitor C2. In this way, the scan lines 321 not having the scan driving signals can be effectively filtered and protected from crosstalk interference caused by energy spillover of neighboring scan lines 321 having the scan driving signals.

In a feasible embodiment, the scan switch component 5 includes a plurality of scan switch units 51 provided on the scan lines 321. Each of the scan switch units 51 has a scan input end 51*a*, a scan output end 51*b*, and a scan grounding end 51*c*. The scan input end 51*a* is electrically connected to the scan driver 3, the scan output end 51*b* is connected to a corresponding scan line 321, and the scan grounding end 51*c* is grounded via the capacitor C2. A first scan switch 511 is provided between the scan input end 51*a* and the scan output end 51*b*, and a second scan switch 512 is provided between the scan output end 51*b* and the scan grounding end 51*c*. The scan driver 3 internally includes a scan switch control module 33, which is able to identify the scan lines 321 synchronously to determine whether the scan lines 321 have the scan driving signals or not and controls the first or the second scan switches 511, 512 to act, so as to electrically connect the scan output ends 51*b* to one of the scan input ends 51*a* and the scan grounding ends 51*c*.

When the above described structure operates, the scan switch control module 33 detects the scan lines 321 synchronously to determine whether the scan lines 321 have the scan driving signals or not, or receives synchronously the scan control signals output by the MCU 1 to determine whether the scan lines 321 have the scan driving signals or not. In the case the scan lines 321 having the scan driving signals or in the case the scan control signals have scan driving signals capable of driving the liquid crystal units 61 to act, the scan switch control module 33 controls the first scan switch 511 to connect the scan input ends 51*a* to the scan output ends 51*b*, so that the scan driving signals output by the scan driver 3 are transmitted via the scan lines 321 to the corresponding liquid crystal units 61 in the stable LCD module 6 and drive the same. On the other hand, in the case the scan lines 321 do not have the scan driving signals, or in the case the scan control signals do not have the scan driving signals for driving the liquid crystal units 61 to act, the scan switch control module 33 controls the second scan switches 512 to connect the scan output ends 51*b* to the scan grounding ends 51*c*, so that the scan lines 321 that do not have the scan driving signals are grounded via the capacitors C2. Therefore, the part of scan lines 321 without the scan driving signals are filtered and protected against crosstalk interference caused as an energy spillover effect generated by near scan lines 321 that have the scan driving signals.

In the above described structure of the present invention, no matter the stable LCD modules 6 has a bistable liquid crystal skeleton, a multistable liquid crystal skeleton, or a memory-type liquid crystal skeleton, or has other similar liquid crystal skeletons that use driven passive matrix to display patterns, the present invention is always applicable to provide the same effect of preventing crosstalk interference. In practical application of the present invention, in the case the stable LCD module 6 is a multistable liquid crystal skeleton, the present invention may also be applied to many other liquid crystal skeletons, such as the cholesteric liquid crystal skeleton, the surface-stabilized ferroelectric liquid crystal skeleton, the bistable twisted nematic liquid crystal skeleton, Semectic A liquid crystal skeleton, and bend-splay nematic liquid crystal skeleton. Therefore, the present invention has a very wide scope of applications.

Figure 4:
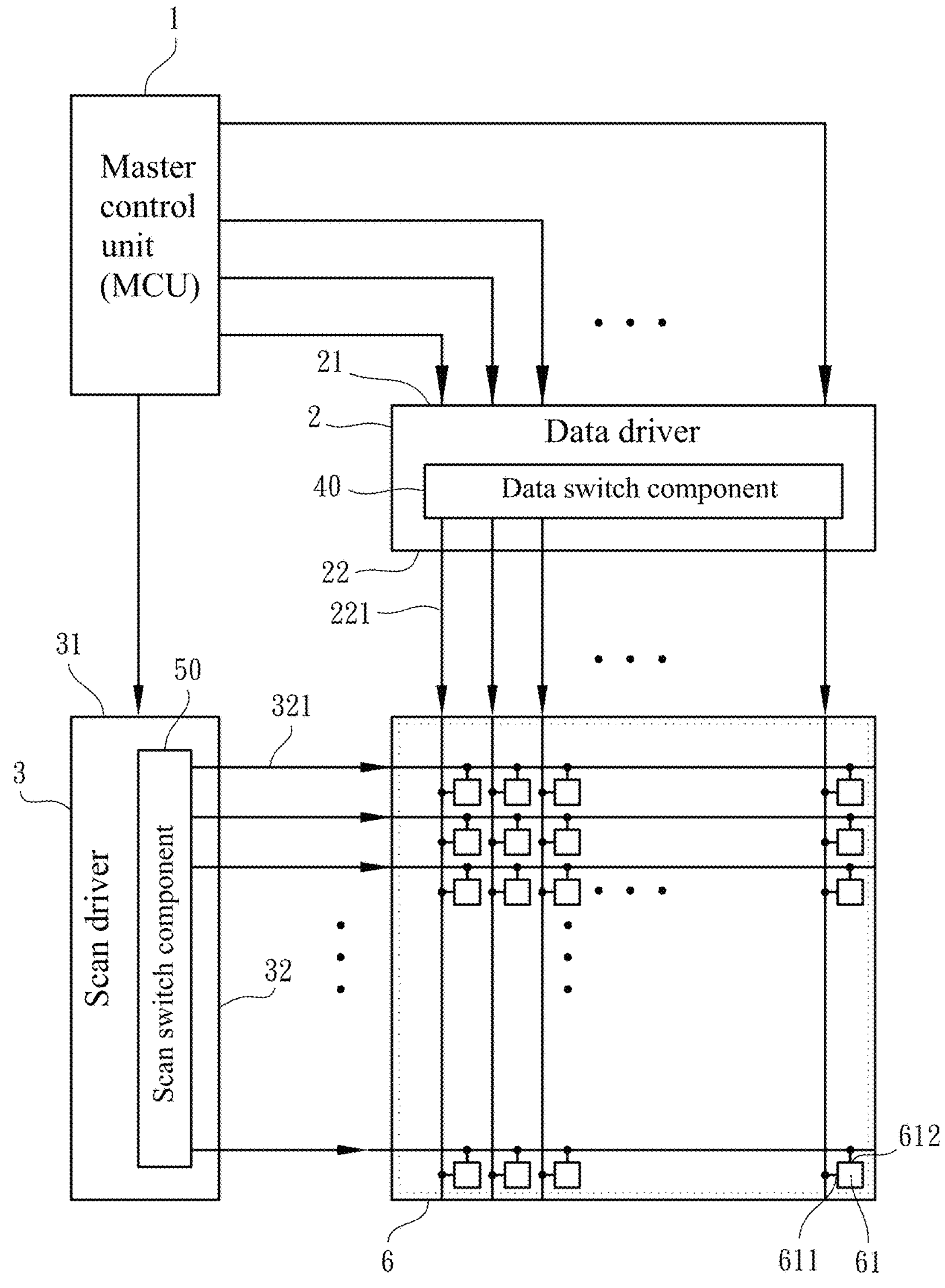
FIG. 4 is a block diagram of a circuit for a second embodiment of the present invention.
Figure 5:
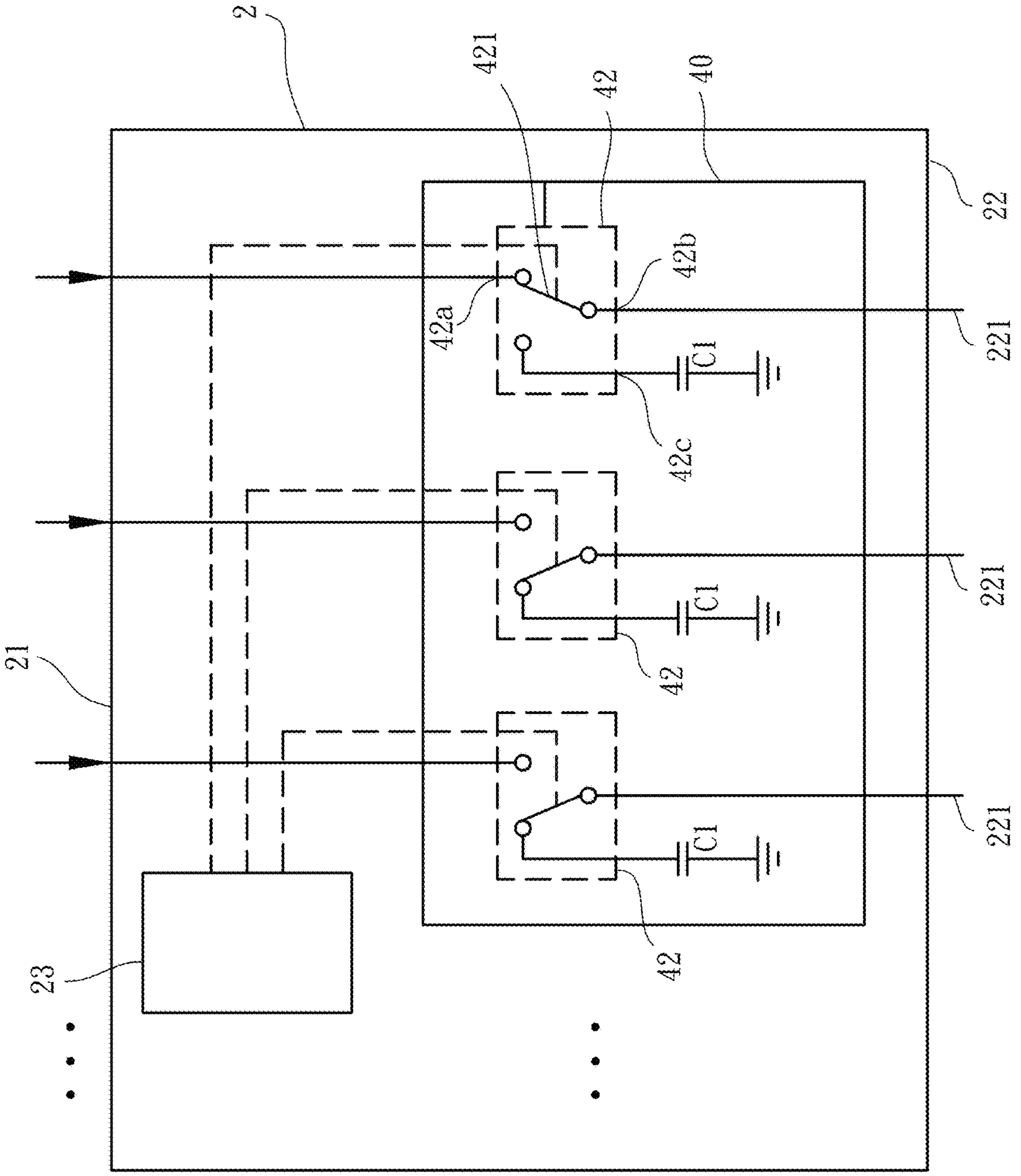
FIG. 5 is a simple circuit diagram showing related portions of a data switch component and a data driver in the second embodiment of the present invention.
Figure 6:
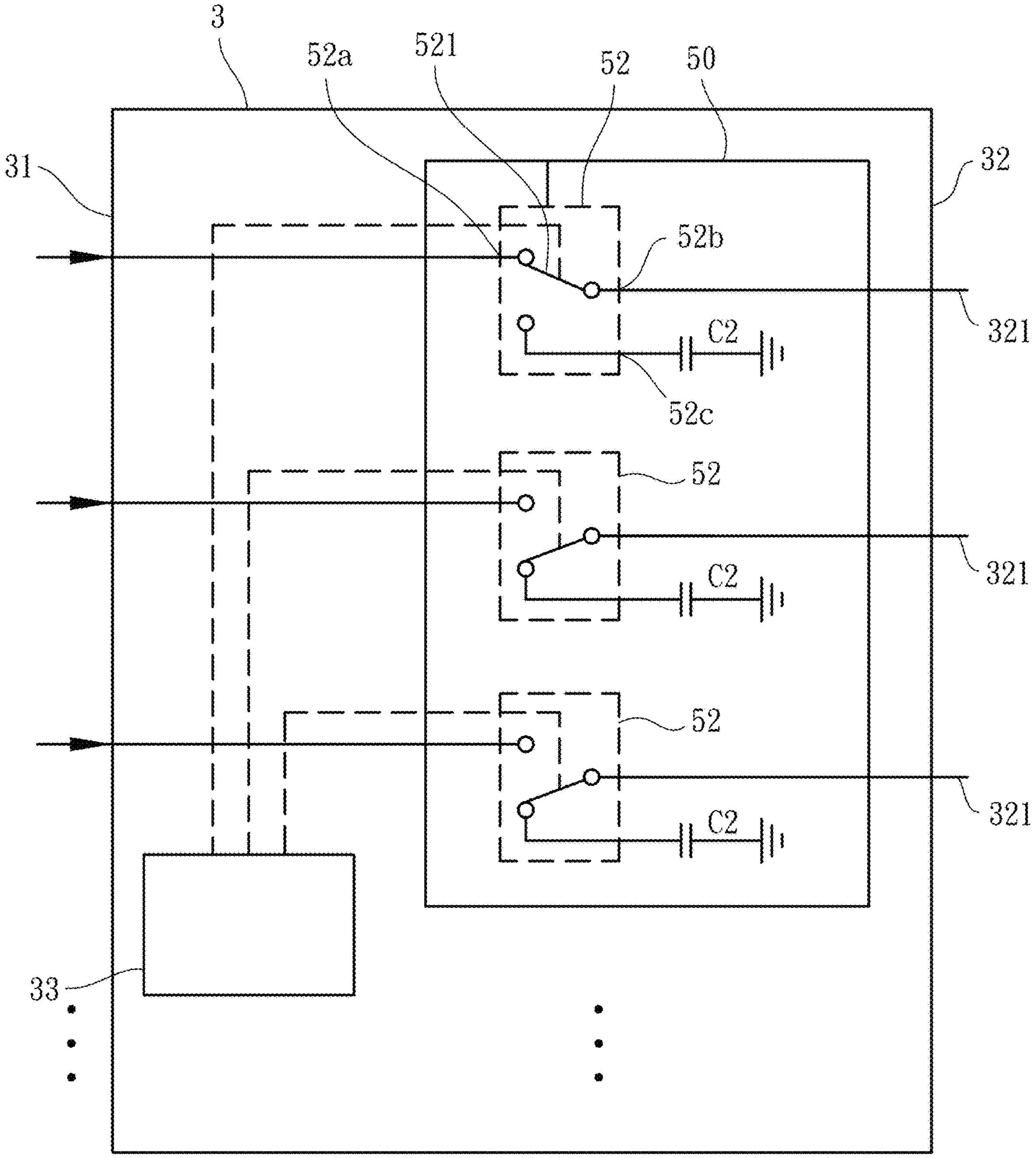
FIG. 6 is a simple circuit diagram showing related portions of a scan switch component and a scan driver of the second embodiment of the present invention.

Please refer to FIGS. 4 to 6. A second embodiment of the present invention includes a data switch component 40, a scan switch component 50, and a data driver 2 and a scan driver 3. Wherein, the data driver 2 and the scan driver 3 are the same as those in the first embodiment. The data driver 2 receives data control signals output by the MCU 1, and the received data control signals are converted at the data driver 2 into data driving signals and transmitted to electrodes 611 of corresponding liquid crystal units 61 in the stable LCD module 6 via at least a part of data lines 221. The scan driver 3 receives scan control signals output by the MCU 1, and the received scan control signals are converted at the scan driver 3 into scan driving signals and transmitted to the other electrodes 612 of the corresponding liquid crystal unit 61 in the stable LCD module 6 via at least a part of scan lines 321. The scan driving signals and the data driving signals together drive the liquid crystal units 61, so that various predetermined images and pictures can be displayed on the stable LCD module 6.

In the second embodiment, the data switch component 40 is integrated with the data driver 2, and the data switch component 40 detects the data lines 221 synchronously to determine whether the data lines 221 have the data driving signals or not. In the case the data lines 221 do not have the data driving signals, the data lines 221 are grounded respectively via a capacitor C1. In this way, data lines 221 that do not have the data driving signals can be effectively filtered and protected from crosstalk interference caused by energy spillover generated by neighboring data lines 221 that have the data driving signals.

In a feasible embodiment, the data switch component 40 has a plurality of data switch units 42 provided on the data lines 221. Each of the data switch units 42 has a data input end 42*a*, a data output end 42*b*, and a data grounding end 42*c*. The data input ends 42*a* are electrically connected to the data driver 2, the data output ends 42*b* are connected to the data lines 221, and the data grounding ends 42*c* are grounded via capacitors C1. The data output ends 42*b* respectively have a data switch 421, which is controllable to selectively connect to the data input ends 42*a* or the data grounding ends 42*c*. The data driver 2 internally includes a data switch control module 23, which is able to identify the data lines 221 synchronously to determine whether the data lines 221 have the data driving signals or not and to control the data switches 421 to act, so that the data output ends 42*b* are electrically connected to one of the data input ends 42*a* and the data grounding ends 42*c*.

When the above structure operates, the data switch control module 23 detects the data lines 221 synchronously to determine whether the data lines 221 have the data driving signals or not, or receives synchronously the data control signals output by the MCU 1 to determine whether the data lines 221 having the data driving signals. In the case the data lines 221 have the data driving signals or the data control signals have the data driving signals for driving the liquid crystal units 61 to act, the data switch control module 23 controls the data switches 421 to electrically connect the data input ends 42*a* to the data output end 42*b*, so that the data driving signals output by the data driver 2 are transmitted via the data lines 221 to the corresponding liquid crystal units 61 in the stable LCD module 6 and drive the corresponding liquid crystal units 61 to act. On the other hand, in the case the data lines 221 do not have the data driving signals, or the data control signals do not have the data driving signals for driving the liquid crystal units 61, the data switch control module 23 controls the data switches 421 to electrically connect the data output ends 42*b* to the data grounding ends 42*c*, so that data lines 221 that do not have the data driving signals are grounded via capacitors C1. Therefore, data lines 221 that do not have the data driving signals are effectively filtered and protected from crosstalk interference caused by energy spillover generated by neighboring data lines 221 that have the data driving signals.

In the second embodiment, the scan switch component 50 is integrated with the scan driver 3. The scan switch component 50 detects the scan lines 321 synchronously to determine whether they have the scan driving signals or not. In the case the scan lines 321 do not have the scan driving signals, the scan lines 321 are respectively grounded via a capacitor C2. In this way, the scan lines 321 that do not have the scan driving signals can be effectively filtered and protected from crosstalk interference caused by energy spillover generated by neighboring scan lines 321 that have the scan driving signals.

In a feasible embodiment, the scan switch component 50 includes a plurality of scan switch units 52 provided on the scan lines 321. Each of the scan switch units 52 has a scan input end 52*a*, a scan output end 52*b*, and a scan grounding end 52*c*. The scan input end 52*a* is electrically connected to the scan driver 3, the scan output end 52*b* is connected to one scan line 321, and the scan grounding end 52*c* is grounded via the capacitor C2. The scan output end 52*b* has a scan switch 521 connected thereto. The scan switch 521 is controllable to selectively connect to the scan input end 52*a* or the scan grounding end 52*c*. The scan driver 3 internally includes a scan switch control module 33 capable of identifying the scan lines 321 synchronously to determine whether the scan lines 321 have the scan driving signals or not and controls the scan switches 521 to act, so that the scan output ends 52*b* are electrically connected to one of the scan input ends 52*a* and the scan grounding ends 52*c*.

When the above described structure operates, the scan switch control module 33 detects the scan lines 321 synchronously to determine whether the scan lines 321 have the scan driving signals or not, or receives synchronously the scan control signals output by the MCU 1 to determine whether the scan lines 321 have the scan driving signals or not. In the case the scan lines 321 have the scan driving signals or the scan control signals have scan driving signals that can drive the liquid crystal units 61 to act, the scan switch control module 33 controls the scan switches 521 to electrically connect the scan input ends 52*a* to the scan output ends 52*b*, so that the scan driving signals output by the scan driver 3 can be transmitted via the scan lines 321 to corresponding liquid crystal units 61 in the stable LCD module 6 and drive the liquid crystal units 61 to act. On the other hand, in the case the scan lines 321 do not have the scan driving signals or the scan control signals do not have the scan driving signals for driving the liquid crystal units 61 to act, the scan switch control module 33 controls the scan switches 521 to electrically connect the scan output ends 52*b* to the scan grounding ends 52*c*, so that the scan lines 321 that do not have the scan driving signals are grounded via the capacitors C2. Therefore, the scan lines 321 that do not have the scan driving signals are effectively filtered and protected from crosstalk interference caused by energy spillover generated by neighboring scan lines 321 that have the scan driving signals.

In conclusion, the structure of stable LCD module capable of reducing crosstalk interference according to the present invention can effectively eliminate crosstalk interference with neighboring areas due to energy spillover generated by driven data lines/scan lines and accordingly, can ensure the LCD module to maintain normal picture quality. Therefore, the present invention meets the requirements of novelty and improvement for granting a patent. It is also understood the present invention has been described with some preferred embodiments thereof and many changes and modifications in the described embodiments can be carried out without departing from the scope and the spirit of the invention that is intended to be limited only by the appended claims.

What is claimed is:

1. A structure of a stable liquid crystal display (LCD) module capable of reducing crosstalk interference, comprising:

at least one data driver (2) having a data input side (21) and a data output side (22), the data input side (21) being electrically connected to a master control unit (MCU) (1), and the data output side (22) being electrically connected via a plurality of data lines (221) to electrodes (611) of liquid crystal units (61) in the stable LCD module (6), the data input side (21) receiving data control signals output by the MCU (1) and the received data control signals being converted at the at least one data driver (2) into data driving signals, which are then transmitted to at least a part of the plurality of data lines (221);

at least one data switch component (4, 40) detecting the plurality of data lines (221) synchronously to determine whether each of the plurality of data lines (221) have the data driving signals, each of the plurality of data lines (221) being grounded via a respective first capacitor (C1) when not having the data driving signals;

at least one scan driver (3) having a scan input side (31) and a scan output side (32), the scan input side (31) being electrically connected to the MCU (1) and the scan output side (32) being connected via a plurality of scan lines (321) to additional electrodes (612) of the liquid crystal units (61) in the stable LCD module (6), the scan input side (31) receiving scan control signals output by the MCU (1) and the received scan control signals being converted at the at least one scan driver (3) into scan driving signals, which are then transmitted to at least a part of the plurality of scan lines (321); and at least one scan switch component (5, 50) detecting the plurality of scan lines (321) synchronously to determine whether each of the plurality of scan lines (321) have the scan driving signals, each of the plurality of scan lines (321) being grounded via a respective second capacitor (C2) when not having the scan driving signals.

2. The structure of the stable LCD module as claimed in claim 1, wherein the at least one data switch component (4, 40) is integrated with the at least one data driver (2), and the at least one scan switch component (5, 50) is integrated with the at least one scan driver (3).

3. The structure of the stable LCD module as claimed in claim 2, wherein the at least one data switch component (4, 40) includes a plurality of data switch circuits (41, 42) provided on the plurality of data lines (221), each of the plurality of data switch circuits (41, 42) having a data input end (41*a*, 42*a*), a data output end (41*b*, 42*b*), and a data grounding end (41*c*, 42*c*), the data input end (41*a*, 42*a*) receiving corresponding data driving signals, the data output end (41*b*, 42*b*) being electrically connected to the electrodes (611) of corresponding liquid crystal units (61) in the stable LCD module (6), and the data grounding end (41*c*, 42*c*) being grounded via the respective first capacitor (C1), the plurality of data switch circuits (41, 42) being controllable to selectively electrically connect the data output end (41*b*, 42*b*) to one of the data input end (41*a*, 42*a*) and the data grounding end (41*c*, 42*c*).

4. The structure of the stable LCD module as claimed in claim 3, wherein the data input end (41*a*, 42*a*) and the data output end (41*b*, 42*b*) of each of the plurality of data switch circuits (41, 42) have a first data switch (411) provided between them, and the data output end (41*b*, 42*b*) and the data grounding end (41*c*, 42*c*) have a second data switch (412) provided between them, the at least one data driver (2) internally including a data switch control circuit (23) configured to control the first and the second data switch (411, 412) to operate, the data output end (41*b*, 42*b*) being thereby selectively electrically connected to one of the data input end (41*a*, 42*a*) and the data grounding end (41*c*, 42*c*).

5. The structure of the stable LCD module as claimed in claim 3, wherein the data input end (41*a*, 42*a*) of each of the plurality of data switch circuits (41, 42) is connected to a data switch (421), and the at least one data driver (2) internally includes a data switch control circuit (23), the data switch control circuit (23) configured to control each data switch (421) to operate, the data output end (41*b*, 42*b*) being thereby selectively electrically connected to one of the data input end (41*a*, 42*a*) and the data grounding end (41*c*, 42*c*).

6. The structure of the stable LCD module as claimed in claim 3, wherein the at least one scan switch component (5, 50) includes a plurality of scan switch circuits (51, 52) provided on the plurality of scan lines (321), each of the plurality of scan switch circuits (51, 52) having a scan input end (51*a*, 52*a*), a scan output end (51*b*, 52*b*), and a scan grounding end (51*c*, 52*c*), the scan input end (51*a*, 52*a*) receiving corresponding scan driving signals, the scan output end (51*b*, 52*b*) being electrically connected to the additional electrodes (612) of corresponding liquid crystal circuits (61) in the stable LCD module (6), and the scan grounding end (51*c*, 52*c*) being grounded via the respective second capacitor (C2), the plurality of scan switch circuits (51, 52) being controllable to selectively electrically connect the scan output end (51*b*, 52*b*) to one of the scan input end (51*a*, 52*a*) and the scan grounding end (51*c*, 52*c*).

7. The structure of the stable LCD module as claimed in claim 2, wherein the at least one scan switch component (5, 50) includes a plurality of scan switch circuits (51, 52) provided on the plurality of scan lines (321), each of the plurality of scan switch circuits (51, 52) having a scan input end (51*a*, 52*a*), a scan output end (51*b*, 52*b*), and a scan grounding end (51*c*, 52*c*), the scan input end (51*a*, 52*a*) receiving corresponding scan driving signals, the scan output end (51*b*, 52*b*) being electrically connected to the additional electrodes (612) of corresponding liquid crystal circuits (61) in the stable LCD module (6), and the scan grounding end (51*c*, 52*c*) being grounded via the respective second capacitor (C2), the plurality of scan switch circuits (51, 52) being controllable to selectively electrically connect the scan output end (51*b*, 52*b*) to one of the scan input end (51*a*, 52*a*) and the scan grounding end (51*c*, 52*c*).

8. The structure of the stable LCD module as claimed in claim 2, wherein the stable LCD module (6) has a liquid crystal skeleton selected from a group consisting of a bistable liquid crystal skeleton, a multistable liquid crystal skeleton, and a memory-type liquid crystal skeleton.

9. The structure of the stable LCD module as claimed in claim 8, wherein the multistable liquid crystal skeleton is selected from a group consisting of a cholesteric liquid crystal skeleton, a surface stabilized ferroelectric liquid crystal skeleton, a bitable twisted nematic liquid crystal skeleton, a Smectic A liquid crystal skeleton, and a bend-splay nematic liquid crystal skeleton.

10. The structure of the stable LCD module as claimed in claim 1, wherein the at least one data switch component (4, 40) includes a plurality of data switch circuits (41, 42) provided on the plurality of data lines (221), each of the plurality of data switch circuits (41, 42) having a data input end (41*a*, 42*a*), a data output end (41*b*, 42*b*), and a data grounding end (41*c*, 42*c*), the data input end (41*a*, 42*a*) receiving corresponding data driving signals, the data output end (41*b*, 42*b*) being electrically connected to the electrodes (611) of corresponding liquid crystal circuits (61) in the stable LCD module (6), and the data grounding end (41*c*, 42*c*) being grounded via the respective first capacitor (C1), the plurality of data switch circuits (41, 42) being controllable to selectively electrically connect the data output end (41*b*, 42*b*) to one of the data input end (41*a*, 42*a*) and the data grounding end (41*c*, 42*c*).

11. The structure of the stable LCD module as claimed in claim 10, wherein the data input end (41*a*, 42*a*) and the data output end (41*b*, 42*b*) of each of the plurality of data switch circuits (41, 42) have a first data switch (411) provided between them, and the data output end (41*b*, 42*b*) and the data grounding end (41*c*, 42*c*) have a second data switch (412) provided between them, the at least one data driver (2) internally including a data switch control circuit (23) configured to control the first and the second data switch (411, 412) to operate, the data output end (41*b*, 42*b*) being thereby selectively electrically connected to one of the data input end (41*a*, 42*a*) and the data grounding end (41*c*, 42*c*).

12. The structure of the stable LCD module as claimed in claim 11, wherein the at least one scan switch component (5, 50) includes a plurality of scan switch circuits (51, 52) provided on the plurality of scan lines (321), each of the plurality of scan switch circuits (51, 52) having a scan input end (51*a*, 52*a*), a scan output end (51*b*, 52*b*), and a scan grounding end (51*c*, 52*c*), the scan input end (51*a*, 52*a*) receiving corresponding scan driving signals, the scan output end (51*b*, 52*b*) being electrically connected to the additional electrodes (612) of corresponding liquid crystal circuits (61) in the stable LCD module (6), and the scan grounding end (51*c*, 52*c*) being grounded via the respective second capacitor (C2), the plurality of scan switch circuits (51, 52) being controllable to selectively electrically connect the scan output end (51*b*, 52*b*) to one of the scan input end (51*a*, 52*a*) and the scan grounding end (51*c*, 52*c*).

13. The structure of the stable LCD module as claimed in claim 12, wherein the scan input end (51*a*, 52*a*) and the scan output end (51*b*, 52*b*) of each of the plurality of scan switch circuits (51, 52) have a first scan switch (511) provided between them, and the scan output end (51*b*, 52*b*) and the scan grounding end (51*c*, 52*c*) of each of the plurality of scan switch circuits (51, 52) have a second scan switch (512) provided between them, the at least one scan driver (3) internally including a scan switch control circuit (33) configured to control the first and the second scan switch (511, 512) to operate, the scan output end (51*b*, 52*b*) being thereby selectively electrically connected to one of the scan input end (51*a*, 52*a*) and the scan grounding end (51*c*, 52*c*).

14. The structure of the stable LCD module as claimed in claim 12, wherein the scan output end (51*b*, 52*b*) of each of the plurality of scan switch circuits (51, 52) is connected to a scan switch (521), and the at least one scan driver (3) internally includes a scan switch control circuit (33), the scan switch control circuit (33) configured to control each scan switch (521) to operate, the scan output end (51*b*, 52*b*) being thereby selectively electrically connected to one of the scan input end (51*a*, 52*a*) and the scan grounding end (51*c*, 52*c*).

15. The structure of the stable LCD module as claimed in claim 10, wherein the data input end (41*a*, 42*a*) of each of the plurality of data switch circuits (41, 42) is connected to a data switch (421), and the at least one data driver (2) internally includes a data switch control circuit (23), the data switch control circuit (23) configured to control each data switch (421) to operate, the data output end (41*b*, 42*b*) being thereby selectively electrically connected to one of the data input end (41*a*, 42*a*) and the data grounding end (41*c*, 42*c*).

16. The structure of the stable LCD module as claimed in claim 15, wherein the at least one scan switch component (5, 50) includes a plurality of scan switch circuits (51, 52) provided on the plurality of scan lines (321), each of the plurality of scan switch circuits (51, 52) having a scan input end (51*a*, 52*a*), a scan output end (51*b*, 52*b*), and a scan grounding end (51*c*, 52*c*), the scan input end (51*a*, 52*a*) receiving corresponding scan driving signals, the scan output end (51*b*, 52*b*) being electrically connected to the additional electrodes (612) of corresponding liquid crystal circuits (61) in the stable LCD module (6), and the scan grounding end (51*c*, 52*c*) being grounded via the respective second capacitor (C2), the plurality of scan switch circuits (51, 52) being controllable to selectively electrically connect the scan output end (51*b*, 52*b*) to one of the scan input end (51*a*, 52*a*) and the scan grounding end (51*c*, 52*c*).

17. The structure of the stable LCD module as claimed in claim 10, wherein the at least one scan switch component (5, 50) includes a plurality of scan switch circuits (51, 52) provided on the plurality of scan lines (321), each of the plurality of scan switch circuits (51, 52) having a scan input end (51*a*, 52*a*), a scan output end (51*b*, 52*b*), and a scan grounding end (51*c*, 52*c*), the scan input end (51*a*, 52*a*) receiving corresponding scan driving signals, the scan output end (51*b*, 52*b*) being electrically connected to the additional electrodes (612) of corresponding liquid crystal circuits (61) in the stable LCD module (6), and the scan grounding end (51*c*, 52*c*) being grounded via the respective second capacitor (C2), the plurality of scan switch circuits (51, 52) being controllable to selectively electrically connect the scan output end (51*b*, 52*b*) to one of the scan input end (51*a*, 52*a*) and the scan grounding end (51*c*, 52*c*).

18. The structure of the stable LCD module as claimed in claim 1, wherein the at least one scan switch component (5, 50) includes a plurality of scan switch circuits (51, 52) provided on the plurality of scan lines (321), each of the plurality of scan switch circuits (51, 52) having a scan input end (51*a*, 52*a*), a scan output end (51*b*, 52*b*), and a scan grounding end (51*c*, 52*c*), the scan input end (51*a*, 52*a*) receiving corresponding scan driving signals, the scan output end (51*b*, 52*b*) being electrically connected to the additional electrodes (612) of corresponding liquid crystal units (61) in the stable LCD module (6), and the scan grounding end (51*c*, 52*c*) being grounded via the respective second capacitor (C2), the plurality of scan switch circuits (51, 52) being controllable to selectively electrically connect the scan output end (51*b*, 52*b*) to one of the scan input end (51*a*, 52*a*) and the scan grounding end (51*c*, 52*c*).

19. The structure of the stable LCD module as claimed in claim 1, wherein the stable LCD module (6) has a liquid crystal skeleton selected from a group consisting of a bistable liquid crystal skeleton, a multistable liquid crystal skeleton, and a memory-type liquid crystal skeleton.

20. The structure of the stable LCD module as claimed in claim 19, wherein the multistable liquid crystal skeleton is selected from a group consisting of a cholesteric liquid crystal skeleton, a surface stabilized ferroelectric liquid crystal skeleton, a bitable twisted nematic liquid crystal skeleton, a Smectic A liquid crystal skeleton, and a bend-splay nematic liquid crystal skeleton.

* * * * *